(12) United States Patent
Peng et al.

(10) Patent No.: US 9,746,227 B2
(45) Date of Patent: Aug. 29, 2017

(54) METHOD FOR CONTROLLING A COMPRESSOR OF A REFRIGERATION SYSTEM, AND REFRIGERATION SYSTEM

(71) Applicant: Kriwan Industrie-Elektronik GmbH, Forchtenberg (DE)

(72) Inventors: Xiaoming Peng, Öhringen (DE); Ulf Kretschmer, Öhringen (DE); Christian Ellwein, Schwäbisch Hall (DE)

(73) Assignee: Kriwan Industrie-Elektronik GmbH (DE)

( * ) Notice: Subject to any disclaimer, the term of this patent is extended or adjusted under 35 U.S.C. 154(b) by 344 days.

(21) Appl. No.: 14/416,837

(22) PCT Filed: Aug. 5, 2013

(86) PCT No.: PCT/EP2013/066397
§ 371 (c)(1),
(2) Date: Jan. 23, 2015

(87) PCT Pub. No.: WO2014/023694
PCT Pub. Date: Feb. 13, 2014

(65) Prior Publication Data
US 2015/0198361 A1     Jul. 16, 2015

(30) Foreign Application Priority Data

Aug. 6, 2012   (DE) .................. 10 2012 107 183
Sep. 24, 2012  (DE) .................. 10 2012 108 983

(51) Int. Cl.
*F25B 1/00*       (2006.01)
*F25B 49/02*      (2006.01)
(Continued)

(52) U.S. Cl.
CPC .......... *F25B 49/022* (2013.01); *F25B 31/006* (2013.01); *F25B 41/043* (2013.01);
(Continued)

(58) Field of Classification Search
CPC ........ F25B 2600/0251; F25B 2400/077; F25B 49/022; F25B 49/025; F04B 2201/0402;
(Continued)

(56) References Cited

U.S. PATENT DOCUMENTS 6,925,823 B2    8/2005  Lifson et al.
2002/0108384 A1 8/2002  Higashiyama
(Continued)

FOREIGN PATENT DOCUMENTS

| DE | 10064218 A1 | 11/2002 |
| DE | 10326171 A1 | 12/2003 |
| DE | 69928055 T2 | 7/2006 |
| DE | 102005052042 A1 | 5/2007 |
| EP | 1710435 B1 | 3/2006 |
| EP | 2428752 A2 | 3/2012 |

(Continued)

*Primary Examiner* — Orlando E Aviles Bosques
(74) *Attorney, Agent, or Firm* — Renner Kenner Greive Bobak Taylor & Weber (57) ABSTRACT

Process for regulating a compressor with motor for a refrigerating system, where the temperature of the cooling site is regulated through an on-off motor mode if the temperature in the compressor exceeds an upper temperature threshold. In addition, the temperature of the cooling site is regulated through a continuous on mode of the motor as soon as the motor has cooled to a lower temperature threshold. The controller converts a variable corresponding to the cooling requirement of the cooling site into a switch signal for a valve, which results in clocked opening and closing of the valve, or uses a frequency converter, which controls the cooling liquid flow through the compressor by regulating the voltage and the frequency of the motor in that the frequency converter converts a variable corresponding to the cooling requirement of a cooling site into a voltage and a frequency for the motor.

15 Claims, 8 Drawing Sheets

(51) Int. Cl.
  *H02H 7/00* (2006.01)
  *F25B 31/00* (2006.01)
  *F25B 41/04* (2006.01)

(52) U.S. Cl.
  CPC ........... *F25B 49/025* (2013.01); *H02H 7/008* (2013.01); *F04B 2201/0402* (2013.01); *F04B 2201/0403* (2013.01); *F04B 2201/0801* (2013.01); *F25B 2400/077* (2013.01); *F25B 2600/02* (2013.01); *F25B 2600/021* (2013.01); *F25B 2600/026* (2013.01); *F25B 2600/0251* (2013.01); *F25B 2600/0253* (2013.01); *F25B 2600/2521* (2013.01); *F25B 2700/2115* (2013.01); *G05B 2219/37429* (2013.01); *Y02B 30/741* (2013.01)

(58) Field of Classification Search
  CPC ..... F04B 2201/0403; F04B 2201/0801; H02H 7/008; G05B 2219/37429
  See application file for complete search history.

(56) References Cited

U.S. PATENT DOCUMENTS

| | | |
|---|---|---|
| 2005/0183434 A1 | 8/2005 | Iritani |
| 2005/0210900 A1 | 9/2005 | Oomura |
| 2009/0205349 A1 | 8/2009 | Lifson et al. |

FOREIGN PATENT DOCUMENTS

| | | |
|---|---|---|
| WO | 2006012955 A1 | 12/2006 |
| WO | 2008143608 A1 | 11/2008 |

METHOD FOR CONTROLLING A COMPRESSOR OF A REFRIGERATION SYSTEM, AND REFRIGERATION SYSTEM

TECHNICAL FIELD

The invention relates to a process for regulating a compressor with motor for a refrigerating system, as well as a refrigerating system.

BACKGROUND OF THE INVENTION

Refrigerating systems are commonly designed to include a compressor as well as a controller for determining the current cooling requirement of a cooling site. Whenever the controller identifies an increased cooling requirement, the controller notifies the compressor to increase performance. Refrigerating systems with a compressor equipped with a frequency converter also contain, in addition to the compressor and the controller, a frequency converter capable of changing the revolutions of the compressor motor in the range of an upper and lower number of revolutions per minute. Whenever the controller identifies an increased cooling requirement, the controller notifies the compressor to increase performance by adjusting its revolutions per minute and therefore the cooling liquid flow.

In addition, it is known that the refrigerating system should be equipped with a motor protection circuit in order to, at a minimum, monitor the parameter characterising compressor operations, such as the winding temperature of the motor, with the compressor switching off if a defined temperature threshold is exceeded or underrun. Such a motor protection circuit is e.g. set out in DE 10 2005 052 042 A1. Triggering motor protection however means that the cooling cycle is necessarily interrupted, which can have serious consequences. In addition, a(n automatic or manual) restart can involve uncertainty about what caused the trigger in the first place. Some compressor manufacturers only allow a compressor to restart in such a case if the cause has been identified and rectified. Such switching off is particularly annoying where no actual component defect or functional error occurred in the system and it switched off only because of an increased demand at the cooling site.

DE 10 2005 052 042 A1 therefore suggested that the current operating condition of the compressor should be taken into account when controlling the performance of the compressor. This can help to prevent a further performance increase from being initiated even though the compressor is approaching the switch-off threshold.

DE 10 2004 048 940 A1 also sets out a process for regulating the performance of a compressor for a refrigerating system where the compressor has a pneumatic or hydraulic servo mechanism for intermittent pauses in cooling liquid supply into a suction chamber. In addition, the compressor has a controller which can be used to create a pulse-width-modulated switch signal for the pneumatic or hydraulic servo mechanism to regulate the intermittent pauses in the cooling liquid supply. The on-off ratio for activating the pneumatic or hydraulic servo mechanism can be adapted to the needs of the cooling site.

DE 699 28 055 T2 and US 20090205349 A1 mention compressors, which regulate cooling liquid flow using a pulse-width-modulated switch signal. U.S. Pat. No. 6,925,823 B2 suggests that the compressor might run at reduced load when a first system state is reached and switched off only when a second system state is reached, in order to delay the switch-off point. DE 100 64 218 A1 describes a process for regulating a cooling unit with at least one compressor and at least two separate cold-storage rooms for different temperatures.

EP 1 710 435 B1 describes how to control activation of the valves on the input side of the compressor, which creates an opening or closing interval. Together, the two intervals create a switch interval. The switch interval must be shorter than the shortest time period during which the temperature in the evaporator of the refrigerating system increases by 10% without suction flow being disrupted.

However, the clocked opening and closing of the valve has the disadvantage that the cooling liquid flow, which normally flows through the motor to cool it, is reduced accordingly. This worsens motor cooling in the compressor, which makes the risk that the motor switches off due to the motor protection circuit more probable.

SUMMARY OF THE INVENTION

The invention is based on the aim of improving the process of regulating the compressor of a refrigerating system or refrigerating unit with a compressor to the extent that the impulse to the motor protection circuit is delayed further or prevented.

According to the process of the invention, in a first illustrative embodiment, the cooling liquid flow is controlled by one valve at a minimum so that the temperature of the cooling site is regulated, where
  at least one temperature in the compressor is measured and analysed, and
  the temperature of the cooling site is regulated by switching the motor on and off if the temperature in the compressor exceeds an upper temperature threshold, and
  the temperature of the cooling site is regulated by continuously switched on motor operations as soon as the motor has cooled to a lower temperature threshold. The controller converts a variable corresponding to the cooling requirement of the cooling site into a switch signal for the valve, which triggers a clocked opening and closing of the valve.

According to the first illustrative embodiment, the refrigerating system of the invention largely consists of at least
  one compressor for compressing the cooling liquid, powered by one motor (1a),
  one valve, which regulates the cooling liquid flow through the compressor,
  one controller, which creates a variable depending on the cooling requirement of a cooling site, and
  one controller communicating with the controller and the valve and activating the valve to regulate the temperature of the cooling site,
  where
  a temperature instrumentation is further to be included to determine at least one temperature in the compressor, which is to be in or on the motor and which communicates with the controller, and
  the controller communicates with the motor in such a way and is designed in such a way that
    the temperature of the cooling site is regulated by switching the motor on and off if the temperature in the compressor exceeds an upper temperature threshold, and
    the temperature of the cooling site is regulated by continuously switched on motor operations as soon as the motor has cooled to a lower temperature threshold. The controller converts a variable corresponding to the cooling requirement of the cooling site into a switch signal for the valve, which triggers a clocked opening and closing of the valve.

According to the invention, the switch signal for the valve is not only adjusted depending on the cooling requirement of the cooling site, but at least one temperature in the compressor is also taken into account in order to prevent an early switching off of the compressor due to the motor protection circuit. Under DE 10 2005 052 042 A1, a temperature was also measured in the compressor, even though the usual rule algorithm was disabled after a certain temperature threshold was reached. It was further suggested to reduce the performance of the compressor irrespective of the demand if the compressor reaches the specified critical operating state, in order to prevent the early activation of the compressor protection.

The invention is now improved in that a targeted on-off motor mode is used for the compressor once an upper temperature threshold is reached: The motor is switched off for a specified or definable initial time period of e.g. 12 minutes and then turned on for a specified or definable second time period of e.g. 5 minutes. These switch-off operations are maintained until a lower temperature threshold is reached. The duration of the on and off periods depends on the target value specification and the permissible operating parameters (minimum runtime, permissible number of starts per hours, etc.) for the cooling liquid compressor. This measure ensures that a specific cooling liquid flow continues to be maintained during the switch-on phase. This in most cases reliably prevents the compressor from switching off due to the motor protection circuit if the cooling site has an increased cooling requirement. As soon as the compressor has cooled to a lower temperature threshold, continuous operations with a continuously switched on motor with a clocked opening and closing of the valve are possible again.

The above measures reliably prevent the motor protection circuit from activating in most cases, which are triggered by an increased cooling requirement.

Further designs of the invention of the object of the sub-claims.

According to a preferred design of the invention, the switch signal of the valve is a pulse-width-modulated signal. In addition, the motor periodically switches on and off in on-off mode.

Preferably, the switch signal has an adjustable on-off ratio, with the controller setting the ratio depending on the variable and the temperature measured in the compressor. The on-off ratio of the switch signal can also be set to shift continuously during a specified switching period when continuous motor operations change to on-off motor mode and vice versa.

The temperature in the compressor can particularly be determined by measuring the motor winding temperature or the temperature of a discharge gas compressed in the compressor. In particular, a sensor circuit with at least one and preferably several PTC sensors with at least two different activating temperatures or one linear temperature sensor whose output signal is split into several sections, can be used.

In addition, the motor should preferably be operated with a motor protection circuit, which switches off the motor if the motor reaches an upper temperature limit. The upper temperature threshold, which triggers the on-off motor mode, must be below the upper temperature limit. Depending on the position of the valve, this must be opened or closed completely when the motor is in on-off mode. If the valve is located on the suction side of the compressor, it will be completely open when the motor is in on-off mode. If, by contrast, the valve is to be located in the compressor bypass, it must be closed when the motor is in on-off mode.

The controller can further have a filter, which changes automatically depending on the rate of change of the variable in order to suppress spurious oscillations.

In a second illustrative embodiment according to the process of the invention to regulate a cooling system compressor with a motor, the cooling liquid flow of a cooling liquid through a compressor is controlled by changing the revolutions of the motor using a frequency converter. The frequency converter converts a frequency and voltage corresponding to the cooling requirement of a cooling site for the compressor motor. In addition, at least one temperature in the compressor is measured and analysed, and the temperature of the cooling site is regulated by switching the motor on and off, preferably for the nominal frequency of the motor (typically the network frequency of 50 Hz or 60 Hz) once the temperature in the compressor exceeds an upper temperature threshold. A more precise regulation of the cooling site temperature is achieved for a continuously switched on motor by changing the revolutions of the motor by regulating the frequency and voltage using the frequency converter as soon as the motor has cooled to a lower temperature threshold.

The refrigerating system according to the invention largely consists of a. a compressor powered by a motor for compressing the cooling liquid,
b. a frequency converter for regulating the revolutions of the motor to regulate the cooling liquid flow through the converter,
c. a controller for creating a variable depending on the cooling requirement of a cooling site,
d. In addition, a temperature instrumentation to be located in or on the motor and communicating with the frequency converter is planned to determine at least one temperature in the compressor. Also, the frequency converter is designed in such a way that the motor runs in on and off mode, preferably for the nominal frequency of the motor, whenever the determined temperature in the compressor exceeds an upper temperature threshold. The motor runs continuously again with a regulated frequency as soon as the motor in on and off mode has cooled to a lower temperature threshold.

According to the invention, the frequency of the motor current (and as such the motor revolutions) is not only adjusted depending on the cooling requirement of the cooling site but at least one temperature in the compressor is also taken into account in order to prevent the compressor from being turned off early on due to the motor protection circuit being activated. Under DE 10 2005 052 042 A1, a temperature was also measured in the compressor, even though the usual rule algorithm was disabled after a certain temperature threshold was reached. It was further suggested to reduce the performance of the compressor irrespective of the demand if the compressor reaches the specified critical operating state, in order to prevent the early activation of the compressor protection.

Bouchareb, M. et al: *Drehzahlregulierung von Kältever­dichtern mit intelligenten Frequenzumrichtern*; KI Luft- and Klimatechnik January 2003; pp. 25-30, describes that, if a frequency converter is used to activate a motor, the winding temperature displays a nearly parabolic trend above the frequency. This results in a minimum winding temperature for the nominal frequency of the motor (typically the network frequency of 50 Hz or 60 Hz) an a significant increase of the winding temperature if the frequency of the motor current is set as lower (e.g. 20 Hz or 30 Hz) or higher (e.g. 70 Hz). The invention is an improvement in that, when an upper temperature threshold is reached, targeted on and off motor mode is now used for the compressor motor, preferably close to the nominal frequency of the motor, until a lower temperature threshold is reached again. The duration of the on and off periods depends on the target value specification and the permissible operating parameters (minimum runtime, permissible number of starts per hours, etc.) for the cooling liquid compressor. This measure ensures that a specific cooling liquid flow continues to be maintained during the switch-on phase. This in most cases reliably prevents the compressor from switching off due to the motor protection circuit if the cooling site has an increased cooling requirement. As soon as the compressor has cooled to a lower temperature threshold, continuous operations with a continuously switched on motor and a changed frequency of the motor current can be used again.

The above measures reliably prevent the motor protection circuit from activating in most cases, which are triggered by an increased cooling requirement.

Further embodiments of the invention are the object of the sub-claims.

The temperature in the compressor can particularly be determined by measuring the motor winding temperature or the temperature of a discharge gas compressed in the compressor. In particular, a sensor circuit with at least one and preferably several PTC sensors with at least two different activating temperatures or one linear temperature sensor whose output signal is split into several sections can be used.

In addition, the motor should preferably be operated with a motor protection circuit, which switches off the motor if the motor reaches an upper temperature limit. The upper temperature threshold, which triggers the on-off motor mode, must be below the upper temperature limit.

The controller can further have a filter, which changes automatically depending on the rate of change of the variable in order to suppress spurious oscillations.

BRIEF DESCRIPTION OF THE DRAWINGS

Further benefits and design features of the invention are outlined in more detailed based on the following description and drawing.

The Drawing

DETAILED DESCRIPTION OF THE INVENTION

Below, the first illustrative embodiment of the invention is described based on FIGS. 1 to 5. The schematic diagram shown in FIG. 1 primarily consists of a compressor 1, a condenser 2, a collector 3, an expansion valve 4 and an evaporator 5. The compressor 1, which is e.g. a piston compressor, sucks in and compresses vaporous cooling liquid. Subsequently, in the condenser, the cooling liquid condenses and then, via collector 3, reaches the expansion valve 4, where it is decompressed. During expansion, cooling liquid pressure reduces so that the cooling liquid cools down and partially evaporates. In the evaporator 5, located in the area of the cooling site 6, the cooling liquid by evaporating absorbs the warmth of the cooling site. The compressor 1 sucks in the evaporated cooling liquid again so that the cooling liquid cycle closes. The cooling liquid flow is controlled using a valve 7 located on or in the compressor based on the cooling requirement of the cooling site 6.

Figure 1:
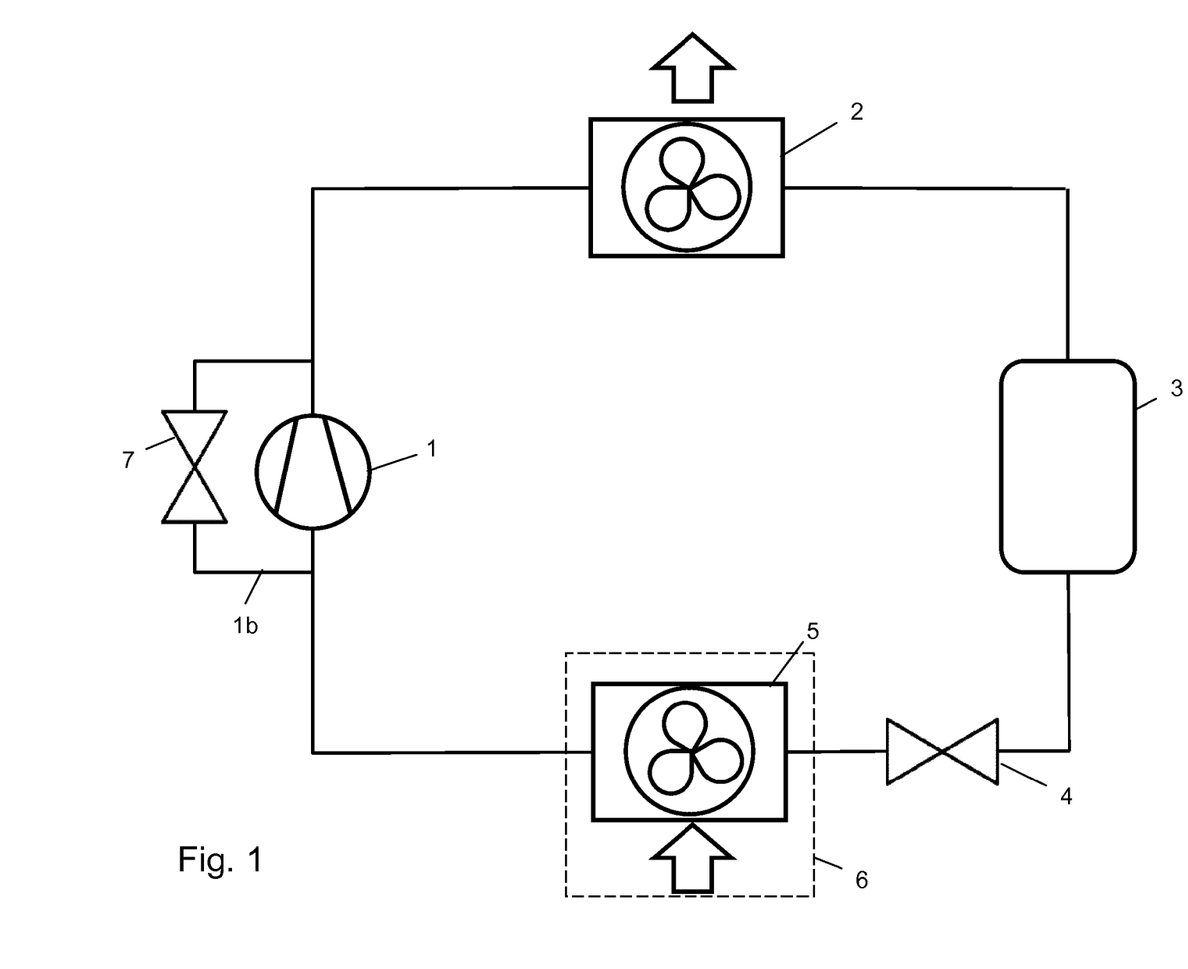
FIG. 1 shows a schematic diagram of a refrigerating system according to the first illustrative embodiment with a valve placed in the bypass.

In the illustrative embodiment according to FIG. 1, valve 7 is located in a bypass 1b so that the cooling liquid flow in the cooling liquid cycle can be increased by closing, and decreased by opening, valve 7.

Figure 2:
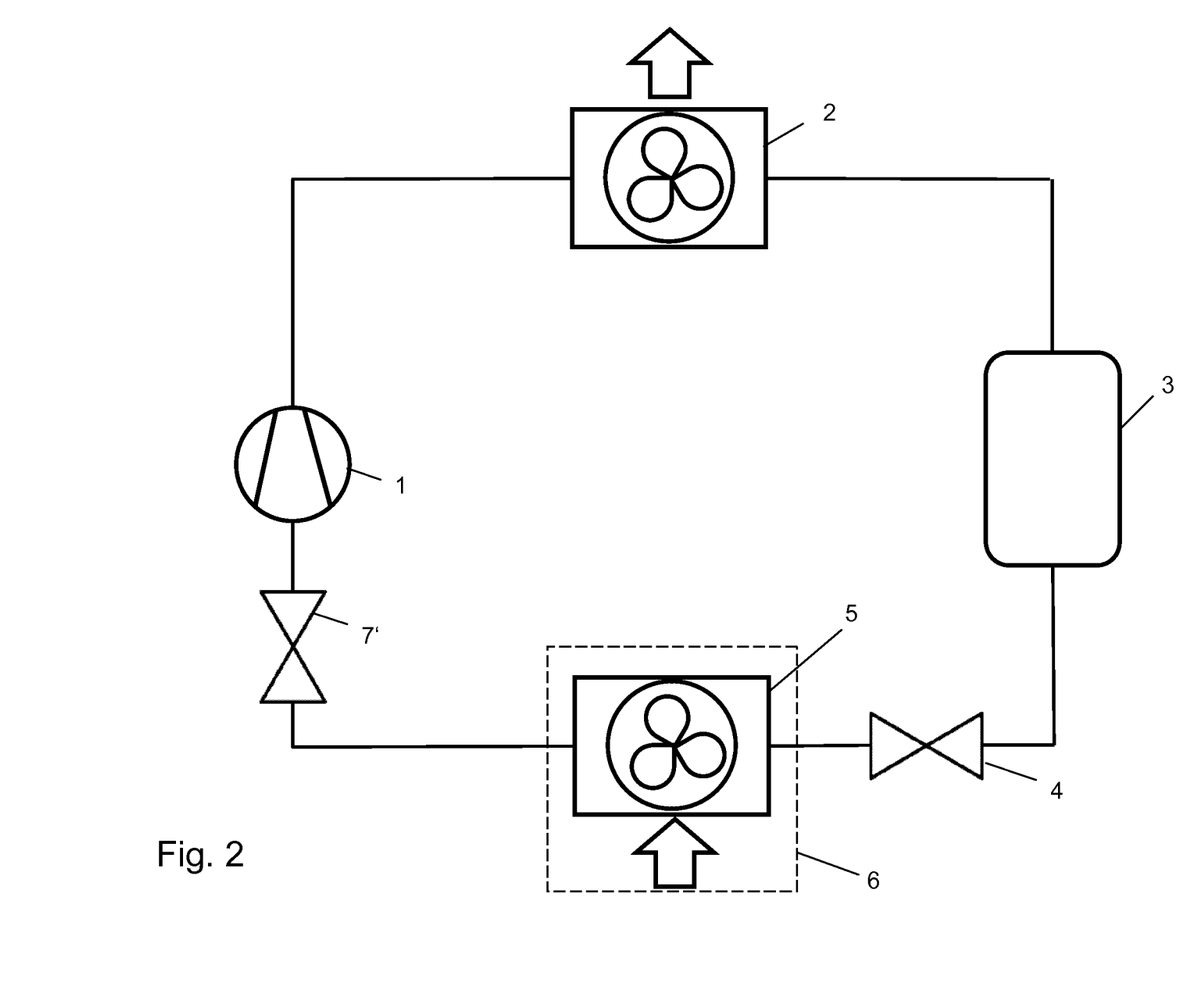
FIG. 2 shows a schematic diagram of a refrigerating system according to the first illustrative embodiment with a valve placed on the suction side.

Instead of locating the valve 7 in a bypass pipe to the compressor, the valve can also be integrated directly into the cooling liquid cycle. A relevant illustrative embodiment is shown in FIG. 2, where the valve 7' is located on the suction side of the compressor 1, i.e. between the evaporator 5 and the compressor 1. In this illustrative embodiment, the valve 7' is also used to regulate the cooling liquid flow with the compressor 1. Since this valve is however directly integrated into the cooling liquid cycle, opening the valve results in an increased cooling liquid flow and closing the valve leads to a reduction in the cooling liquid flow.

The illustrations in FIG. 1 and FIG. 2 are schematic diagrams. Normally, the valves are integrated directly into the compressor because this has energetic benefits. The valves 7/7' often do not impact on the entire cooling liquid flow through the compressor but only on partial flows, e.g. through individual cylinders or cylinder banks.

Figure 3:
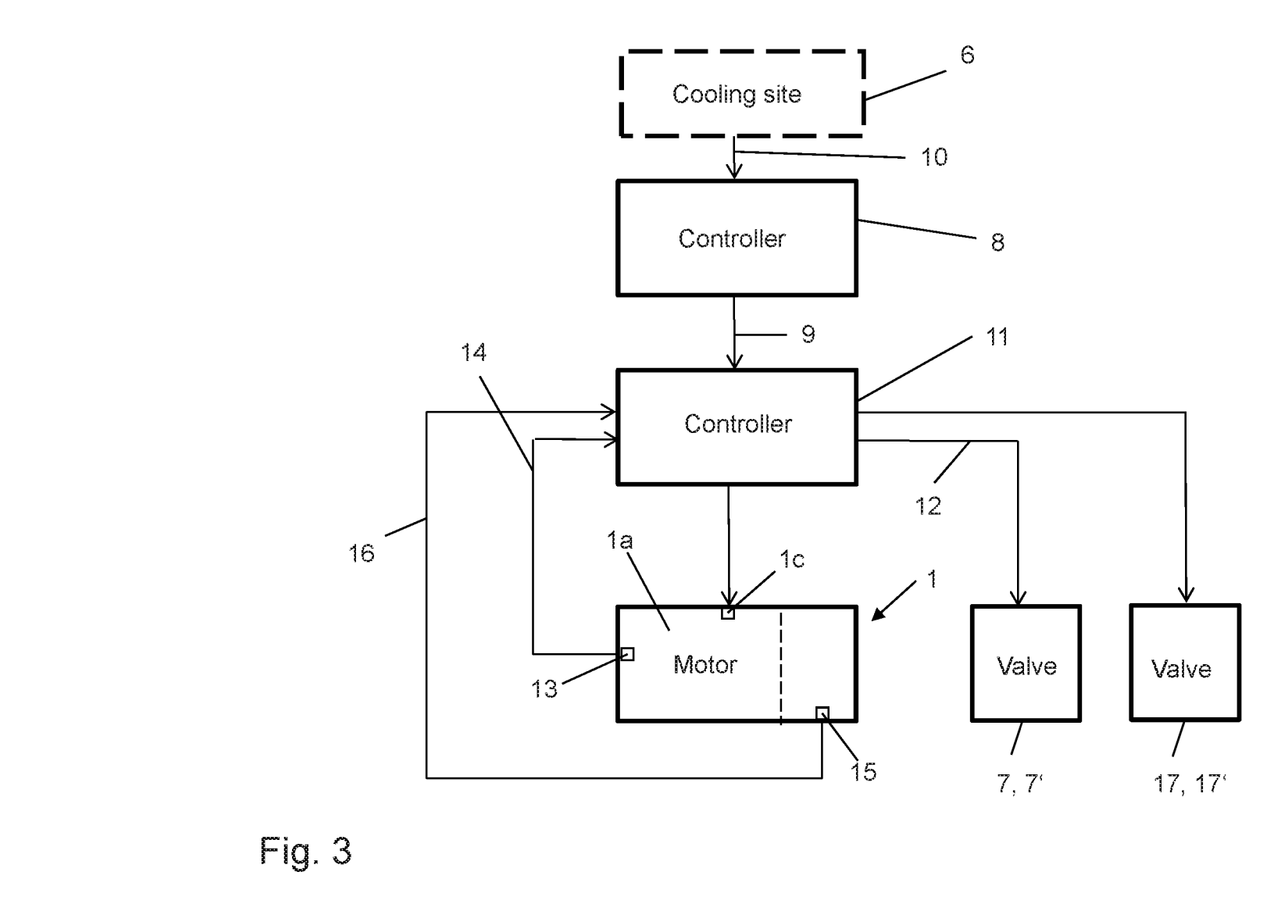
FIG. 3 shows a schematic block diagram of a refrigerating system according to the first illustrative embodiment with a controller and controller.

Controlling the cooling liquid flow through the compressor based on the cooling requirement of the cooling site 6 is described in more detail using the block diagram in FIG. 3. A controller 8 is to be used for this purpose to create a variable 9 depending on the cooling requirement of the cooling site 6. An instrumentation not illustrated further is used to e.g. compare to actual temperature of the cooling site 6 with a target temperature. Any variations 10 are sent to the controller 8, which creates a variable 9 based on a defined algorithm, which is passed to a controller 11, where the variable 9 corresponding to the cooling requirement of the cooling site 6 is converted into one or several switch signal(s) 12 for the valve(s) 7, 7', 17, 17' . . .

The compressor 1, which can e.g. be a piston compressor, at a minimum has one motor 1a, which heats up according to the work done. In a beneficial design of the invention, the compressor 1 is constructed such that the cooling liquid flowing through the compressor can also be used to cool the motor. Nevertheless, the temperature of the compressor can reach values, which no longer make it possible to increase performance further and which trigger a motor protection circuit if the temperature rises further, which then turns off the motor. As a result, it is necessary for a temperature in the compressor to be determined using a suitable sensor circuit 13 and a corresponding temperature signal 14 is passed to the controller 11. The sensor circuit 13 can e.g. be a sensor for measuring the winding temperature of the motor 1. For this purpose, the sensor circuit can e.g. consist of one, preferably several, PTC sensors with at least two different activating temperatures, or of one linear temperature sensor, whose initial signal is split into several sections. E.g. EP 2 187 494 A1 describes a sensor circuit, which would be suitable for this purpose.

The sensor circuit 13 can also be supplemented, or replace, by a sensor circuit 15, which is used to determine the temperature of the discharge gas compressed in the compressor. A corresponding temperature signal 16 is also passed to the controller 11. The controller 11 can contain a motor protection circuit 1c, which switches off the motor 1a, if it reaches an upper temperature limit T3, measured by at least one sensor circuit 13, 15. More details regarding such a motor protection circuit can also be found in EP 2 187 494 A1. When the temperature limit T3 is reached, and the compressor is subsequently turned off, this results in the cooling site 6 no longer being cooled further until the cause of the compressor turning off is found and the compressor restarts.

Preferably, the switch signal 12 is formed by a pulse-width-modulated signal (PWM signal), with the on-off ratio (ED), i.e. the phase ratio according to which the valve opens and closes, is set according to the variable 9. It should be noted here that the on-off ratio of course depends on the order of the valve to be activated (bypass or suction side).

Figure 4:
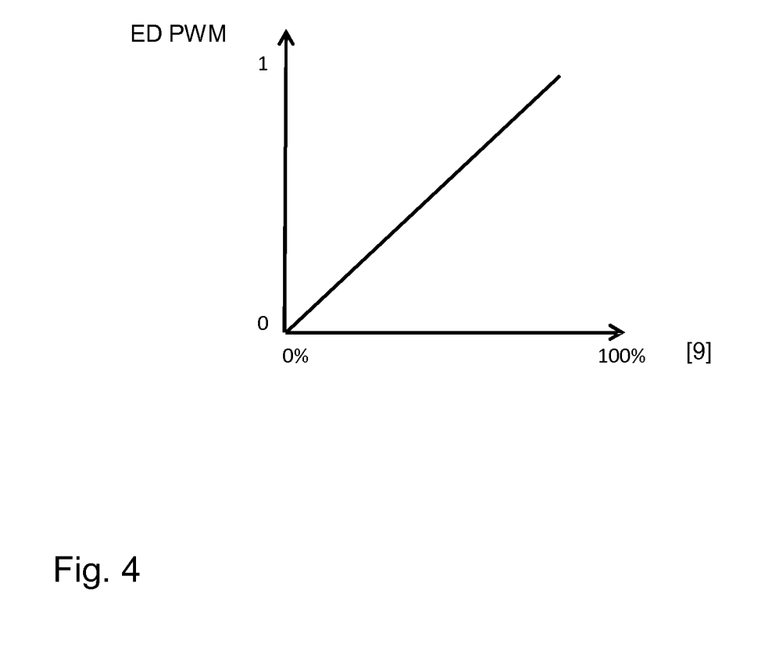
FIG. 4 shows the on-off-ratio of the pulse-width-modulated signal based on the variable.

FIG. 4 shows a possible on-off ratio ED of the PWM signal based on the variable 9. This means that the on-off ratio (ED)=0, that the valve 7 located in the bypass is closed completely or the valve 7' located on the suction side is completely open. At an on-off ratio of 1, the valve 7 is completely open and/or the valve 7' is completely closed. If the on-off ratio is within a range of 0 and 1, during a period of e.g. 20 seconds, the valve is open for part of this period and closed for another part. Such regulation can mean that the temperature in the compressor rises to the temperature limit T3, which is when the motor protection circuit is activated.

In order to avoid this situation at least in most cases, the compressor is not run in continuous mode only, in which the motor would be on continuously and a clocked opening and closing of the valve would take place according to the switch signal 12. Instead, when the upper temperature threshold T2 is reached, which is still below the temperature limit T3, the motor runs in on-off mode. In on-off mode, the motor periodically switches off for a specified time period of e.g. 10 min and then switches on again for a second specified duration. During the on phase, the on-off ratio of the valve is set so that a maximum cooling liquid flow runs through the compressor. The motor runs in on-off mode until the motor has cooled to below a lower temperature threshold T0. From then on, continuous operations with a continuously switched on motor and clocked opening and closing of the valve follow.

Figure 5:
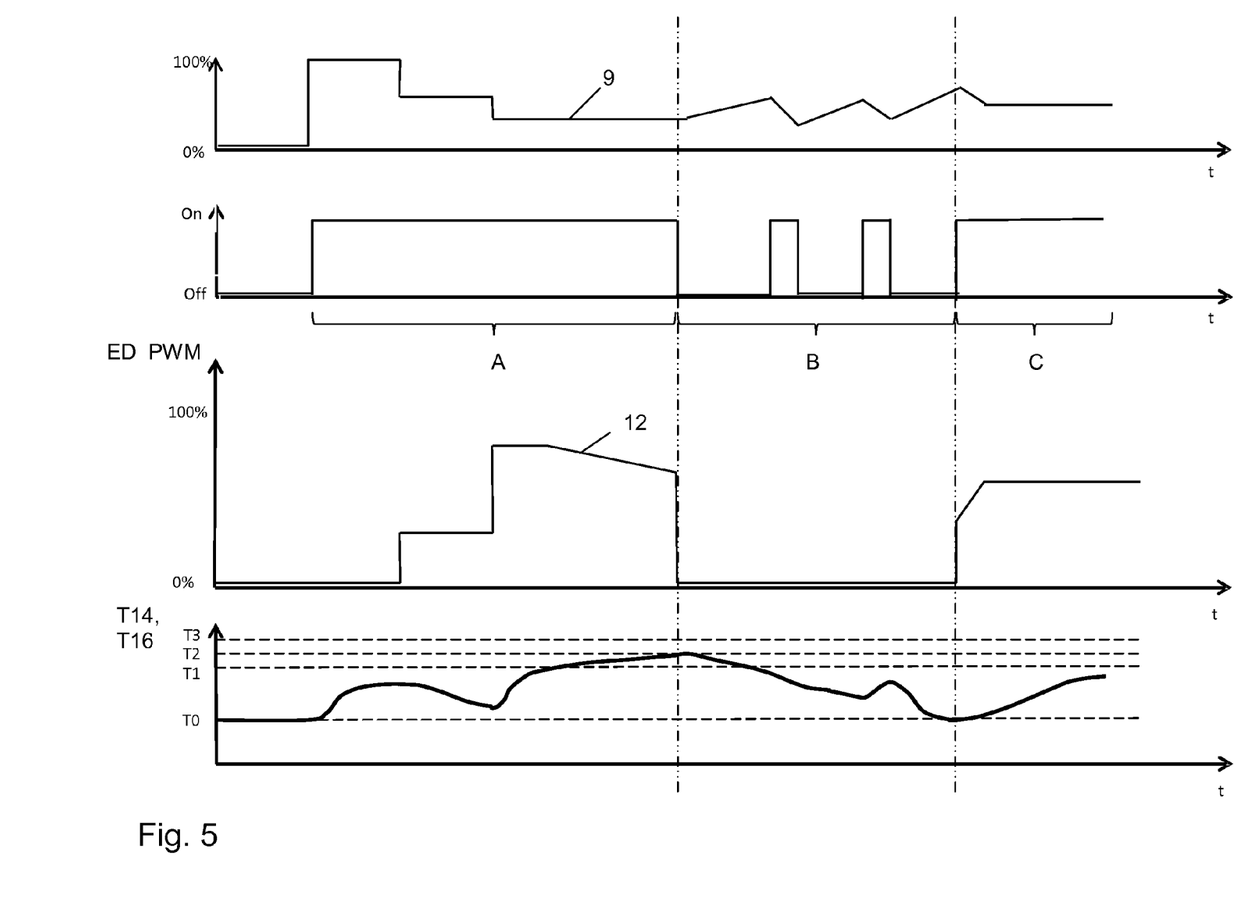
FIG. 5 shows different characteristic lines for the first illustrative embodiment during continuous operations and the on-off motor mode.

FIG. 5 shows four characteristic lines for regulating the motor 1a of the compressor 1 over time. From the top to the bottom, the variable 9, the motor operating mode, the on-off ratio of the valve 7' from FIG. 2 and the temperature signal T14 or T16 are shown. The variable 9 of the upper characteristic line has a maximum variable (100%) in section A after cooling at the cooling site 6 is turned on, requiring maximum compressor performance. The motor is therefore switched on according to the second characteristic line. The valve 7' is activated with an on-off ratio of 0%, which means that the valve is completely open. The temperature shown in the lowest characteristic line in the compressor increases initially. Further on in section A, the further cooling requirement at cooling site 6 falls so that the variable 9 is reduced accordingly. However, the motor of the compressor remains permanently switched on. The lower variable 9 triggers a shift in the one-off ratio (ED) of the PWM signal according to the third characteristic line.

The temperature of the compressor initially falls accordingly. Given the reduced cooling liquid flow, the situation can occur that, as shown here, the temperature in the compressor increases. In order to lessen the temperature increase, the on-off ratio (ED) is shifted when the temperature T1 is reached in such a way that an increased cooling aid flow runs through the compressor, which slightly lessens the temperature increase.

Nevertheless the upper temperature threshold T2 is still reached at the end of the Section A. This has the result that the compressor motor in section b now runs in on-off mode. While the motor is switched off, the temperature at the cooling site increases, which can be identified due to a correspondingly higher variable. In on-off motor mode, it is advisable for the valve to be set to maximum cooling aid flow through the motor and also through the cooling circuit. Which also results in a corresponding reduction in the variable. Further on and off phases follow. During on-off mode, the motor cools from the upper temperature threshold T2 to a lower temperature threshold T0. As soon as the lower temperature threshold T0 is reached, the motor runs continuously again and more precise temperature regulation is again carried out using clocked opening and closing of the valve (section c). In this way, the temperature can in most cases be prevented from reaching the upper temperature limit T3 when the motor protection circuit is activated. On-off mode in section B is characterised by a periodic switching on and off of the motor, with the relevant on and off periods being adapted to external circumstances (construction features of the compressor, cooling load etc.).

The on-off ratio (ED) displays a volatile transition between the different states in the characteristic line. However, the invention makes it possible for the change to occur with a continuous transition.

Figure 6:
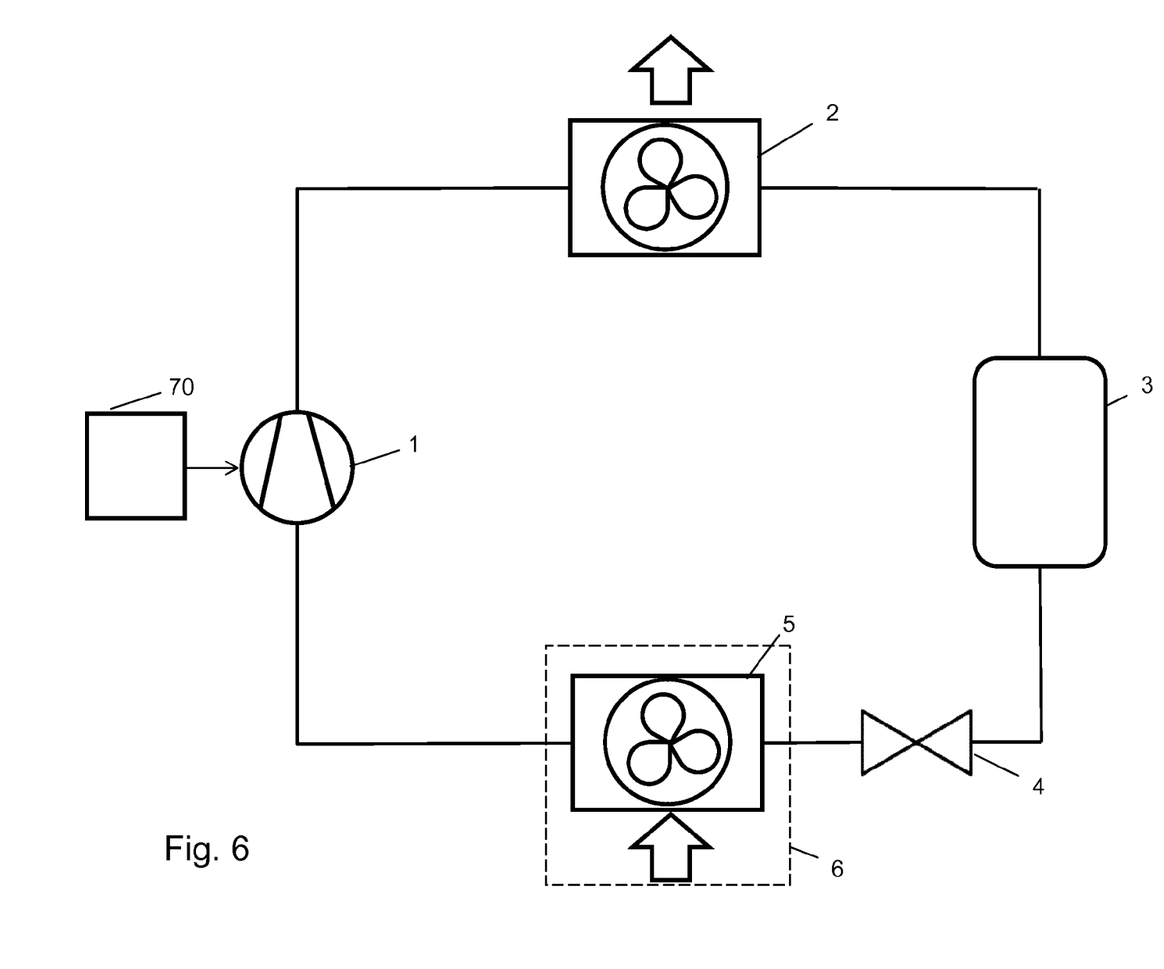
FIG. 6 shows a schematic diagram of a refrigerating system according to the second illustrative embodiment with a frequency converter to regulate the frequency and voltage of the motor.
Figure 7:
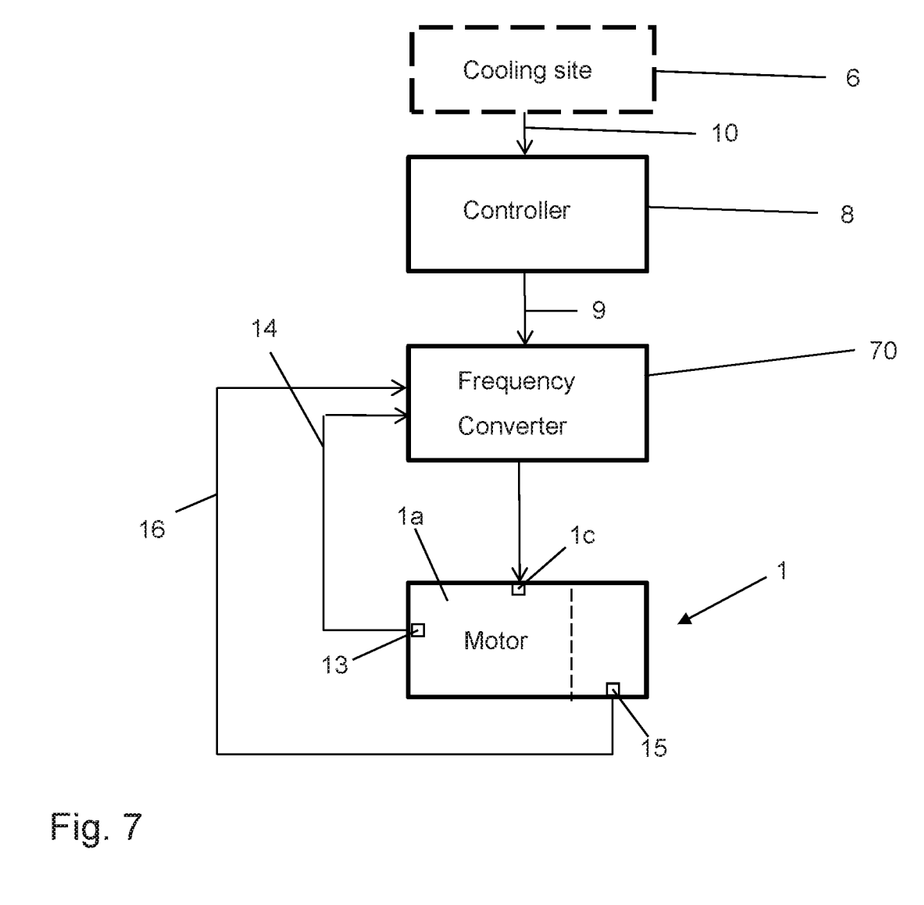
FIG. 7 shows a schematic block diagram of a refrigerating system according to the second illustrative embodiment with a frequency converter and controller and FIG. 8 shows different characteristic lines for the second illustrative embodiment during continuous operations and on-off motor mode.
Figure 8:
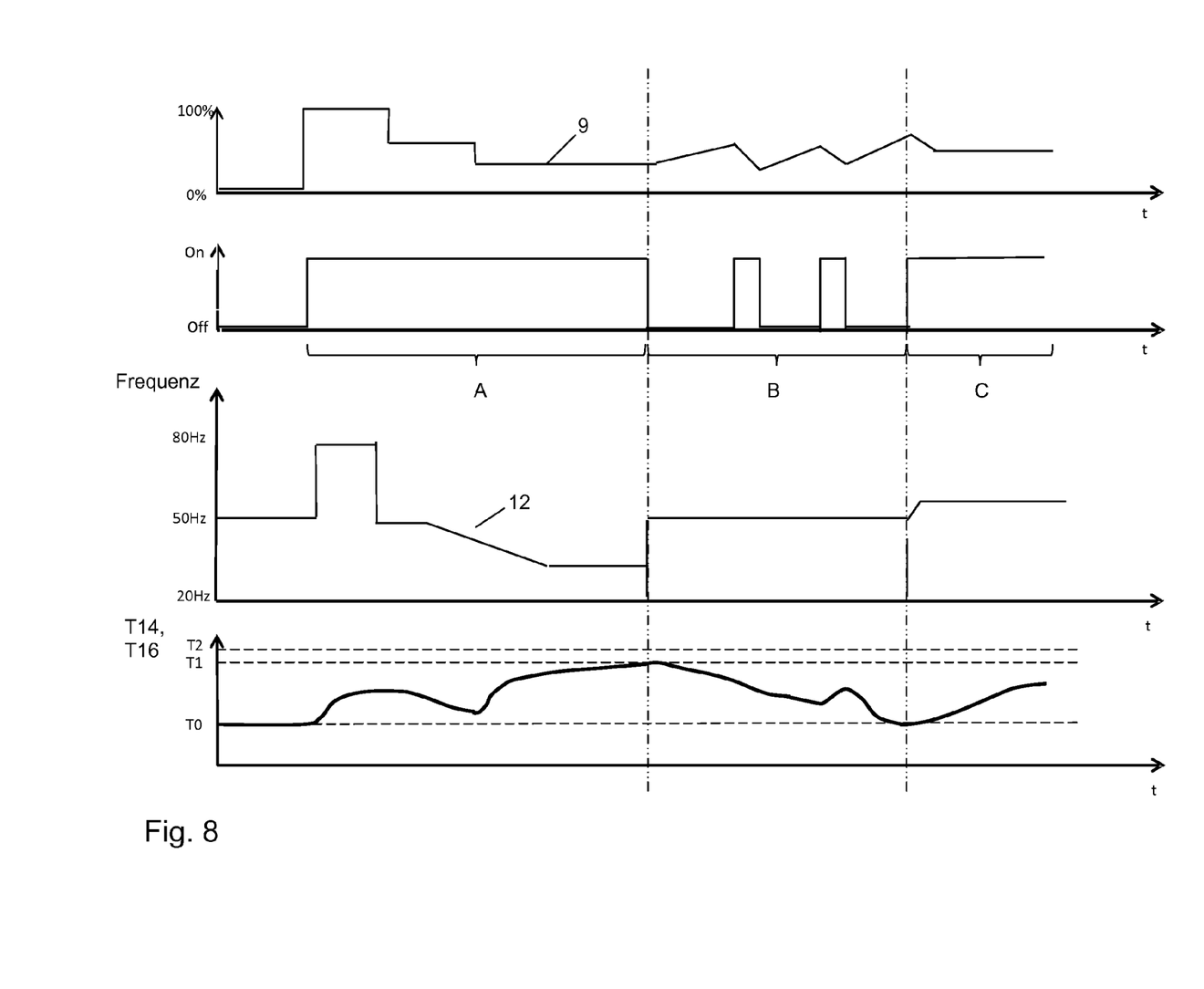

Below, FIGS. 6 to 8 are used to describe the second illustrative embodiment.

The schematic diagram of a refrigerating system in FIG. 6 in turn primarily consists of a compressor 1, a condenser 2, a collector 3, an expansion valve 4 and an evaporator 5. In the compressor 1, which can e.g. be a piston compressor, vaporous cooling liquid is sucked in and compressed. Subsequently, in the condenser, the cooling liquid condenses and then, via collector 3, reaches the expansion valve 4, where it is decompressed. During expansion, cooling liquid pressure reduces so that the cooling liquid cools down and partially evaporates. In the evaporator 5, located in the area of the cooling site 6, the cooling liquid by evaporating absorbs the warmth of the cooling site. The compressor 1 sucks in the evaporated cooling liquid again so that the cooling liquid cycle closes. The cooling liquid flow is controlled using a frequency converter 70 located on or in the compressor based on the cooling requirement of the cooling site 6.

FIG. 6 is a schematic drawing. Controlling the cooling liquid flow through the compressor based on the cooling requirement of the cooling site 6 is described in more detail using the block diagram in FIG. 7. A controller 8 is to be used for this purpose to create a variable 9 depending on the cooling requirement of the cooling site 6. An instrumentation not illustrated further is used to e.g. compare to actual temperature of the cooling site 6 with a target temperature. Any variations 10 are sent to the controller 8, which creates a variable 9 based on a defined algorithm, which is passed to the frequency converter 70, where the variable 9 corresponding to the cooling requirement of the cooling site 6 is converted into the frequency and voltage for the compressor 1.

The compressor 1, which can e.g. be a piston compressor, at a minimum has one motor 1*a*, which heats up according to the work done. In a beneficial design of the invention, the compressor 1 is constructed such that the cooling liquid flowing through the compressor can also be used to cool the motor. Nevertheless, the temperature of the compressor can reach values, which no longer make it possible to increase performance further and which trigger a motor protection circuit if the temperature rises further, which then turns off the motor. It is therefore necessary for a temperature in the compressor to be determined using a suitable sensor circuit 13 and a corresponding temperature signal 14 for the frequency converter 70. The sensor circuit 13 can e.g. be a sensor for measuring the winding temperature of the motor 1. For this purpose, the sensor circuit can e.g. consist of one, preferably several, PTC sensors with at least two different activating temperatures, or of one linear temperature sensor, whose initial signal is split into several sections. E.g. EP 2 187 494 A1 describes a sensor circuit, which would be suitable for this purpose.

The sensor circuit 13 can also be supplemented, or replace, by a sensor circuit 15, which is used to determine the temperature of the discharge gas compressed in the compressor. A corresponding temperature signal 16 is also passed to the frequency converter 70. The frequency converter can contain a motor protection circuit 1*c*, which switches off the motor 1*a* once an upper temperature limit T3 is reached measured based on at least one of the sensor circuits 13, 15. More details regarding such a motor protection circuit can also be found in EP 2 187 494 A1. When the temperature limit T3 is reached, and the compressor is subsequently turned off, this results in the cooling site 6 no longer being cooled further until the cause of the compressor turning off is found and the compressor restarts.

In order to avoid this situation at least in some cases, the compressor is not exclusively run with regulated voltage and frequency where the motor is continuously switched on. Instead, once an upper temperature threshold T1 is reached, which is still below the temperature limit T2, the motor runs in on-off mode for the nominal frequency of the motor (e.g. 50 Hz or 60 Hz). In on-off mode, the motor periodically switches off for a specified time period of e.g. 10 min and then switches on again for a second specified duration. The motor runs in on-off mode until the motor has cooled to below a lower temperature threshold T0. From then on, continuous operations with a continuously switched on motor and regulated voltage and frequency can occur again.

FIG. 8 shows four characteristic lines for the process of regulating the motor 1*a* of the compressor 1 over time. From the top to the bottom, these are the variable 9, the motor operating mode, the frequency with which the frequency converter runs the motor 1*a* as well as the temperature signal T14 or T16. The variable 9 of the upper characteristic line has a maximum variable (100%) in section A after cooling at the cooling site 6 is turned on, requiring maximum compressor performance. According to the second characteristic cure, the motor is therefore switched on and runs at a frequency higher than the nominal frequency. The temperature shown in the lowest characteristic line in the compressor increases initially. Further on in section A, the further cooling requirement at cooling site 6 falls so that the variable 9 is reduced accordingly. The motor of the compressor remains continuously switched on over the entire period but runs at a frequency lower than the nominal frequency.

The temperature of the compressor initially falls accordingly. Given the reduced cooling liquid flow, the situation can occur that, as shown here, the temperature in the compressor increases. At the end of section A, the upper temperature threshold T1 is reached. This has the result that the compressor motor in section b now runs in on-off mode. While the motor is switched off, the temperature at the cooling site increases, which can be identified due to a correspondingly higher variable. If the motor is in on mode, the motor runs at its nominal frequency (e.g. 50 Hz or 60 Hz). Further on and off phases follow. During on-off mode, the motor cools from the upper temperature threshold T1 to a lower temperature threshold T0, because in on mode, either more cooling liquid flows through the motor than for frequencies lower than the nominal frequency or motor current in off mode equals zero ampere. As soon as the lower temperature threshold T0 is reached, the motor runs continuously again and more precise temperature regulation is performed again by regulating the motor frequency (section C). In this way, the temperature can in most cases be prevented from reaching the upper temperature limit T3 when the motor protection circuit is activated. On-off mode in section B is characterised by a periodic switching on and off of the motor, with the relevant on and off periods being adapted to external circumstances (construction features of the compressor, cooling load etc.).

The frequency of the motor current displays a volatile transition between the different states in the characteristic line. However, the invention makes it possible for the change to occur with a continuous transition.

The invention claimed is:

1. A process for regulating a compressor for a refrigerating system with a motor, where a controller regulates the cooling liquid flow through the compressor via at least one valve thus regulating the temperature of a cooling site, where
in addition at least one temperature in the compressor is measured and analysed, and
the temperature of the cooling site is regulated using an on-off mode of the motor once the temperature in the compressor exceeds an upper temperature threshold, wherein the on-off mode of the motor is characterised by a periodic switching on and off of the motor in that the motor is switched off for a specific or definable initial time period and then switched on for a specific or definable second time period, and where the on-off mode is maintained until the at least one temperature in the compressor reaches a lower temperature threshold, and
the temperature of the cooling site is regulated using a continuously switched on motor as soon as the motor reaches the lower temperature threshold, and the controller converts a variable corresponding to the cooling requirement of the cooling site into a switch signal for the at least one valve, which results in a clocked opening and closing of the at least one valve.

2. The process according to claim 1, characterised by the switch signal having an adjustable on-off ratio and the controller setting the ratio based on the variable.

3. The process according to claim 2, characterised by the on-off ratio of the switch signal shifting from continuous motor operations to the on-off mode of the motor and vice versa during a change in a defined switching period.

4. The process according to claim 1, characterised by the temperature in the compressor being determined by measuring the winding temperature of the motor or by measuring the temperature of a discharge gas compressed in the compressor.

5. The process according to claim 1, characterised by the temperature in the compressor being determined using a sensor circuit with at least one PTC sensor with at least two different activating temperatures or one linear temperature sensor whose initial signal is split into several sections.

6. The process according to claim 1, characterised by the motor being run with a motor protection circuit, which switches off the motor if the motor reaches an upper temperature limit, wherein the upper temperature threshold at which the motor changes to the on-off mode is below the upper temperature limit.

7. The process according to claim 1, wherein the at least one valve is located on the suction side of the compressor which is fully open when the motor is in the on-off mode.

8. The process according to claim 1, wherein the compressor is run with a bypass, and the at least one valve is located in the bypass and is fully closed when the motor is in the on-off mode.

9. A refrigerating system with at least
a. a compressor for compressing the cooling liquid, which is propelled by a motor,
b. a valve, which regulates cooling liquid flow through the compressor,
c. a first controller, which creates a variable based on a cooling requirement of a cooling site, and
d. a second controller, which communicates with the first controller and the valve and activates the valve in order to regulate the temperature at the cooling site,
e. a temperature sensor in or on the motor and communicating with the second controller and determining at least one temperature in the compressor,
wherein the second controller communicates with the motor and is configured to regulate the temperature of the cooling site using an on-off mode of the motor once the temperature in the compressor exceeds an upper temperature threshold, wherein the on-off mode of the motor is characterised by a periodic switching on and off of the motor in that the motor is switched off for a specific or definable initial time period and then switched on for a specific or definable second time period, and where the on-off mode is maintained until the at least one temperature in the compressor reaches a lower temperature threshold, and
the temperature of the cooling site is regulated by continuously switched on motor operations as soon as the motor has cooled to the lower temperature threshold, and the second controller converts a variable corresponding to the cooling requirement of the cooling site into a switch signal for the valve, which triggers a clocked opening and closing of the valve.

10. A process for regulating a compressor with motor for a refrigerating system, where a frequency converter is used to control the cooling liquid flow through the compressor by regulating the voltage and frequency of the motor in that the frequency converter converts a variable corresponding to a cooling requirement of a cooling site into a voltage and a frequency for the motor,
characterised by the fact that in addition, at least one temperature in the compressor is measured and analysed, and a temperature of the cooling site is regulated by switching the motor on and off once the temperature in the compressor exceeds an upper temperature threshold, wherein the on-off mode of the motor is characterised by a periodic switching on and off of the motor in that the motor is switched off for a specific or definable initial time period and then switched on for a specific or definable second time period, and where the on-off mode is maintained until the at least one temperature in the compressor reaches a lower temperature threshold, and the temperature at the cooling site is regulated in the case of a continuously switched on motor by regulating the voltage and frequency of the motor as soon as the motor has cooled to the lower temperature threshold.

11. The process according to claim 10, characterised by the motor in the on-off mode being run at its nominal frequency during the second time period in which the motor is switched on.

12. The process according to claim 10, characterised by the temperature in the compressor being determined by measuring the winding temperature of the motor or by measuring the temperature of a discharge gas compressed in the compressor.

13. The process according to claim 10, characterised by the temperature in the compressor being determined using a sensor circuit with at least one PTC sensor with at least two different activating temperatures or one linear temperature sensor whose initial signal is split into several sections.

14. The process according to claim 10, characterised by the motor being run with a motor protection circuit, which switches off the motor if an upper temperature limit of the motor is reached, wherein the upper temperature threshold at which the motor changes to the on-off mode is below the upper temperature limit.

15. A refrigerating system with at least
a. one compressor for compressing the cooling liquid run by a motor,
b. one controller for creating a variable depending on the cooling requirement of a cooling site, and
c. a frequency converter communicating with the controller and the motor to implement the variable corresponding to the cooling requirement of the cooling site into a voltage and a frequency for the motor to control the cooling liquid flow through the compressor,
characterised by the inclusion of a temperature sensor located in or on the motor and communicating with the frequency converter to determine at least one temperature in the compressor, and the frequency converter communicates with the motor and is configured such that the motor is run in an on-off mode if the determined temperature in the compressor exceeds an upper temperature threshold, wherein the on-off mode of the motor is characterised by a periodic switching on and off of the motor in that the motor is switched off for a specific or definable initial time period and then switched on for a specific or definable second time period, and where the on-off mode is maintained until the at least one temperature in the compressor reaches a lower temperature threshold, and that the motor runs continuously again and the voltage and frequency of the motor current is regulated depending on the variable as soon as the motor in the on-off mode cools to the lower temperature threshold.

* * * * *